United States Patent
Muthu-Manivannan et al.

(10) Patent No.: US 9,569,958 B2
(45) Date of Patent: Feb. 14, 2017

(54) PRIORITIZATION OF POWER SYSTEM RELATED DATA

(75) Inventors: Karthick Muthu-Manivannan, College Station, TX (US); Carl L. Benner, Bryan, TX (US); Peng Xu, College Station, TX (US); Billy Don Russell, College Station, TX (US)

(73) Assignee: The Texas A&M University System, College Station, TX (US)

( * ) Notice: Subject to any disclaimer, the term of this patent is extended or adjusted under 35 U.S.C. 154(b) by 2440 days.

(21) Appl. No.: 12/031,990

(22) Filed: Feb. 15, 2008

(65) Prior Publication Data

US 2009/0210100 A1 Aug. 20, 2009

(51) Int. Cl.
*G06F 15/16* (2006.01)
*G08C 25/00* (2006.01)
*H04L 29/06* (2006.01)

(52) U.S. Cl.
CPC ........... *G08C 25/00* (2013.01); *H04L 63/1408* (2013.01); *H04L 63/1433* (2013.01)

(58) Field of Classification Search
CPC .................. H04L 63/1408; H04L 63/1433
USPC ................................... 709/230, 231
See application file for complete search history.

(56) References Cited

U.S. PATENT DOCUMENTS 6,735,704 B1 * 5/2004 Butka et al. ............. 713/300
2007/0239372 A1 * 10/2007 Schweitzer ............. 702/57

* cited by examiner

*Primary Examiner* — Adnan Mirza
(74) *Attorney, Agent, or Firm* — Trego, Hines & Ladenheim, PLLC

(57) ABSTRACT

A method for prioritizing events on an electrical power system, including: (a) acquiring at least one data portion representative of the behavior of the electrical power system, the at least one data portion containing at least one power system event; (b) assigning at least one rank value to the at least one data portion based on the type of power system event, the rank value indicative of a priority of the event; and (c) conducting subsequent operations on the at least one data portion in accordance with the at least one rank value.

14 Claims, 5 Drawing Sheets

PRIORITIZATION OF POWER SYSTEM RELATED DATA

BACKGROUND OF THE INVENTION

An electric power system is a complex interconnection of many components. Customers switch their loads on and off independently, causing feeder loading levels to vary over time. Utility apparatus connected to these feeders also operate from time to time, to maintain proper delivery of service to customers and to protect equipment. All of these contribute to continuous variations in feeder loading levels and electrical characteristics. Some electrical changes indicate system conditions that need immediate attention to prevent further damage to the system or connected equipment, to restore service, etc. Other changes indicate conditions that are suboptimal and that should be addressed at the utility's earliest convenience. Still others indicate normal system operation and may not need any specific attention unless the utility or its customers experience an unusual condition whose solution may be aided by knowledge about normal operations of the system.

Operations and maintenance (O&M) personnel often lack data and information that would help them perform their functions better. Conversely some modern systems can provide so much information that personnel become overwhelmed, and this situation also negatively affects their ability to perform their functions optimally. Thus having too much information arguably can be as bad as having too little.

A related difficulty in receiving and using information in optimal ways has to do with communication system typically available in substations and even more especially at remote points on feeders. In situations in which substations are unmanned, information has to be provided to operations personnel elsewhere before those personnel can respond. If monitoring equipment is located somewhere other than the substation (e.g., on a pole somewhere between the substation and end users), the quality of communications generally is even lower than at substations. During normal operations the amount of data that modern monitoring equipment can collect in a substation is substantial. Communication channels to substations often have very limited capacity and can take a significant amount of time to transmit information, even during normal operating conditions.

When abnormal conditions (e.g., when a piece of equipment begins to fail or when a fault occurs) occur, the amount of information can get even larger. This can affect the ability of operations personnel to receive and act upon information in a timely way. If information is simply transmitted in the order in which it is collected, operator notification of critical events may be delayed while awaiting the transmission of relatively unimportant information to finish. It would be better for critical information to be transmitted first, with transmission of relatively unimportant information being postponed. Some utilities may not want certain types of relatively unimportant, routine information to ever be sent to operations and maintenance personnel, except in special circumstances in which they are performing some type of special study or troubleshooting.

BRIEF SUMMARY OF THE INVENTION

These and other shortcomings of the prior art are addressed by the present invention, which according to one aspect provides a method for prioritizing events on an electrical power system, including: (a) acquiring at least one data portion representative of the behavior of the electrical power system, the at least one data portion containing at least one power system event; (b) assigning at least one rank value to the at least one data portion based on the type of power system event, the rank value indicative of a priority of the event; and (c) conducting subsequent operations on the at least one data portion in accordance with the at least one rank value.

According to another aspect of the invention, a computer program product includes one or more computer readable media having stored thereon a plurality of instructions that, when executed by one or more processors of a system, causes the one or more processors to: (a) acquire at least one data portion representative of the behavior of an electrical power system, the at least one data portion containing at least one power system event; (b) assign at least one rank value to the at least one data portion based on the type of power system event, the rank value indicative of a priority of the event; and (c) conduct subsequent operations on the at least one data portion in accordance with the at least one rank value.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Referring now to the Figures, the present invention provides a method for prioritizing power system events. As used herein, the term "power system event" is used to refer to any deviation from steady-state operation which is deemed to be significant for analytical purposes. Non-limiting examples of power system events include actual or incipient equipment failures, as well as normal operational events. Following are several examples of actual power system events that have been recorded and that illustrate normal, abnormal, and critical events to which prioritization may be applied.

EXAMPLE 1

Repetitive Overcurrent Fault Due to Vegetation Intrusion

Figure 1:
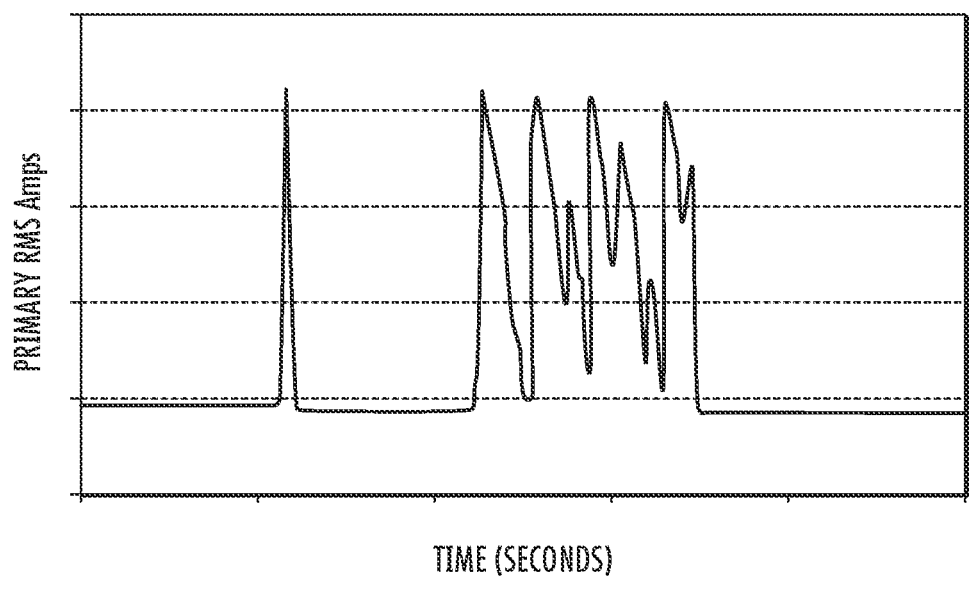
FIG. 1 is a schematic chart showing an example of a repetitive overcurrent fault in an electrical power system.

FIG. 1 shows RMS (root-mean-square) current measurements from one instance of an overcurrent fault that was caused by vegetation intrusion. Overcurrent faults are not desired but they happen from time to time on power systems. In many cases their cause is temporary (e.g., animal contact, lightning, etc.) and automatic protection systems can clear them without causing any customers to experience sustained outages. The event illustrated in FIG. 1 is of interest to utility companies but may not be considered highly critical, although it almost certainly would be considered more important than, say, a customer load coming on. Although the singular instance of the fault may be only moderately important to a utility user, if it continues to recur it may indicate a permanent problem that needs to be addressed before it escalates into a more serious problem.

In this example, similar events occurred 14 times over a period of 23 hours and finally burned down the affected line. Table 1 shows the times at which the overcurrent was recorded by monitoring equipment. A line on the ground obviously can represent a safety hazard. This burn-down also caused an outage of 62 minutes for 140 customers. Bringing such recurrent events to the attention of utility operations personnel as early as possible could help prevent outages, further damage to equipment, and hazards to life. A series of such overcurrent faults may have very high priority although any single fault in the series may have much lower priority.

TABLE 1

| Day | Time of Event |
|-----|---------------|
| 1   | 06:57:47      |
| "   | 07:58:33      |
| 2   | 00:09:06      |
| "   | 00:16:48      |
| "   | 00:40:38      |
| "   | 00:40:53      |
| "   | 01:10:51      |
| "   | 01:12:37      |
| "   | 01:15:30      |
| "   | 03:24:47      |
| "   | 04:19:39      |
| "   | 04:30:36      |
| "   | 05:51:00      |
| "   | 06:19:45      |

More specific to this particular example, there are two instances of the fault on the morning of Day 1, and then none until a few minutes after midnight on Day 2, some sixteen hours later. Following that there are many recorded operations over the next six hours. The utility might choose to investigate at their earliest convenience after the first one or two measurements. When four additional instances occurred in a 40-minute period after midnight, this event would become more critical and they might choose to dispatch a crew, even in the middle of the night. In this example that would have given them about five hours to locate the problem, which in this case happened to be a broken tree limb hanging on a conductor and causing an intermittent short circuit between that conductor and another proximate conductor. Had they found the problem prior to the final episodes listed below they could have removed the limb and avoided the additional interruptions, outage and burn down. The utility would be denied the opportunity to do this, however, if an operator failed to recognize this unusual sequence of events in the midst of an inundation of other information that potentially was less critical. The utility also would be denied the opportunity to respond effectively if transmission of the data from the substation or poletop location was queued behind normal system events, such as large customer loads switching or capacitor banks switching.

EXAMPLE 2

Unbalanced Capacitor Switching On

Figure 2:
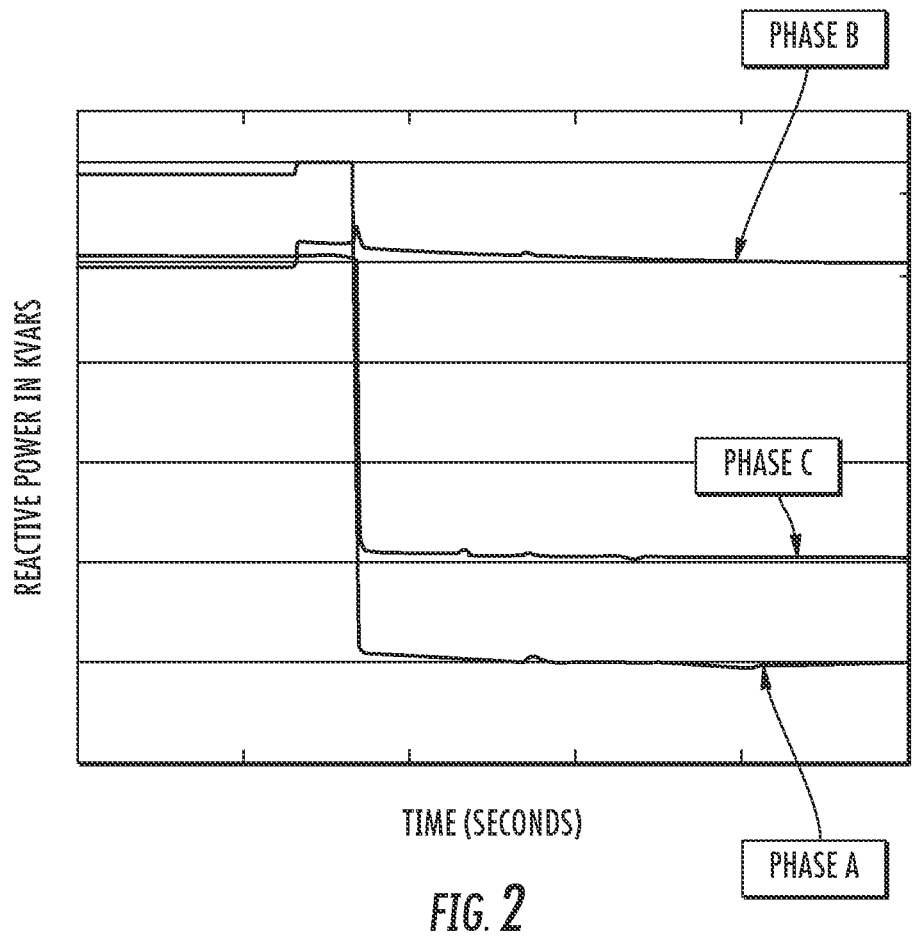
FIG. 2 is a schematic chart showing an example of an unbalanced capacitor switching on event.

FIG. 2 shows reactive power measurements over a period of five seconds, measured during one instance of an unbalanced capacitor switching on event. It can be clearly seen that Phase A and Phase C VARS step down at around 1.5 seconds and Phase B VARS remains almost unchanged. Most utilities apply capacitors on a three-phase basis and switching a capacitor bank ON or OFF normally would produce VAR changes that are essentially the same on all three phases. On feeders that employ balanced capacitor banks, the condition illustrated in FIG. 2 can be used to tell the utility company that the bank has a problem that will require a technician to visit the bank to make a repair.

The unbalanced capacitor switching may have been the result of a blown fuse on phase B or the result of a failed capacitor unit on that phase. This is a common failure mode for capacitor banks on distribution circuits and often goes undiagnosed and uncorrected until the utility company performs periodic maintenance, which typically occurs only one time per year. Even though it is important to make the appropriate repair to restore optimal feeder operation, the utility user may not consider it critical to fix the problem in hours or even days, and it certainly is not as time critical as the previous example involving repetitive overcurrent. The user may prefer not to be notified of the problem immediately, but instead want it to go on a maintenance schedule that may be generated periodically (e.g., weekly).

EXAMPLE 3

Motor Start

Figure 3:
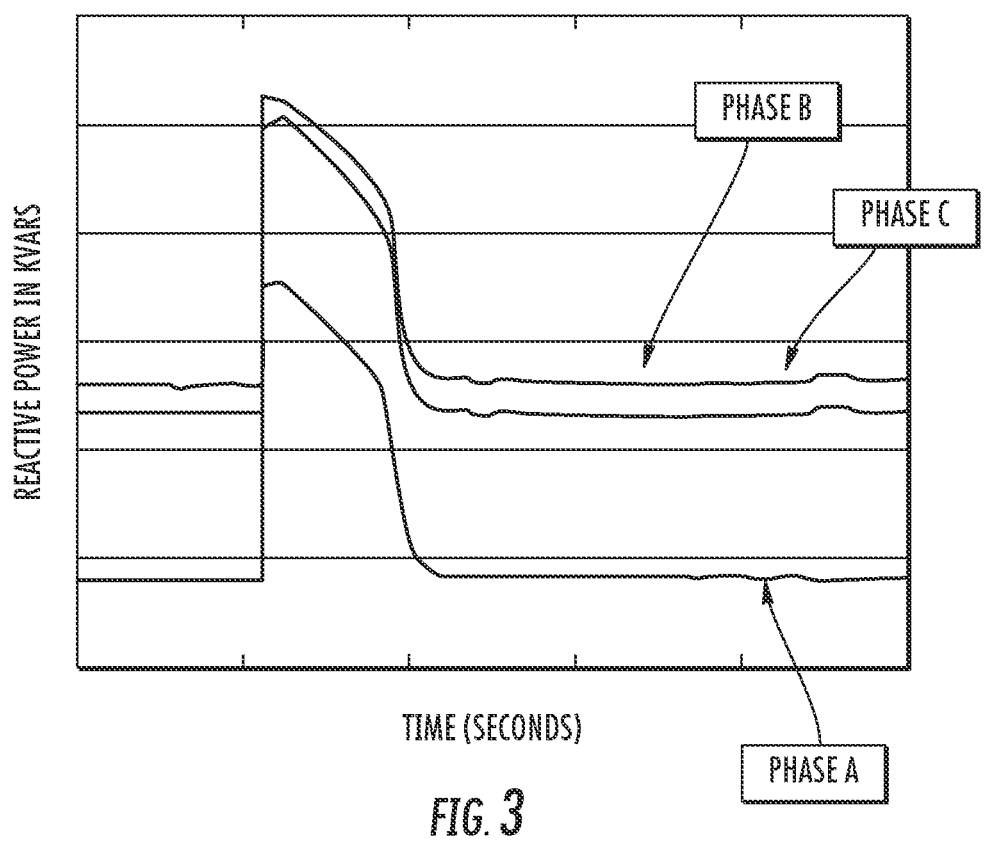
FIG. 3 is a schematic chart showing an example of a motor starting event.

FIG. 3 shows the reactive power values measured when a large motor started on a monitored feeder. Motor start events are normal events and may occur multiple times on a given feeder over the course of a day. Because this represents a normal operation on the feeder, the utility user generally is not interested in this kind of event and may not want to be informed of this type of event, since there is no action to be taken. Instead, the occurrence of the event and some characteristics corresponding to this event may be logged for statistical purposes. A ranking system may assign these events with a relatively low ranking value, hence reducing the volume of data that needs to be analyzed by the user. Such information may be kept for a period of time, however, because they utility user might want access under special circumstances. For example, a customer on the feeder in question might complain of frequent dips or sags in supply voltage. Starting a large motor can cause a temporary sag in the feeder's voltage, which can cause problems for other customers, especially if the motor is very large and the other customers have equipment that is particularly sensitive to variations in supply voltage. In such a situation, it is valuable for the utility's troubleshooter to know of large motor starts.

Figure 4:
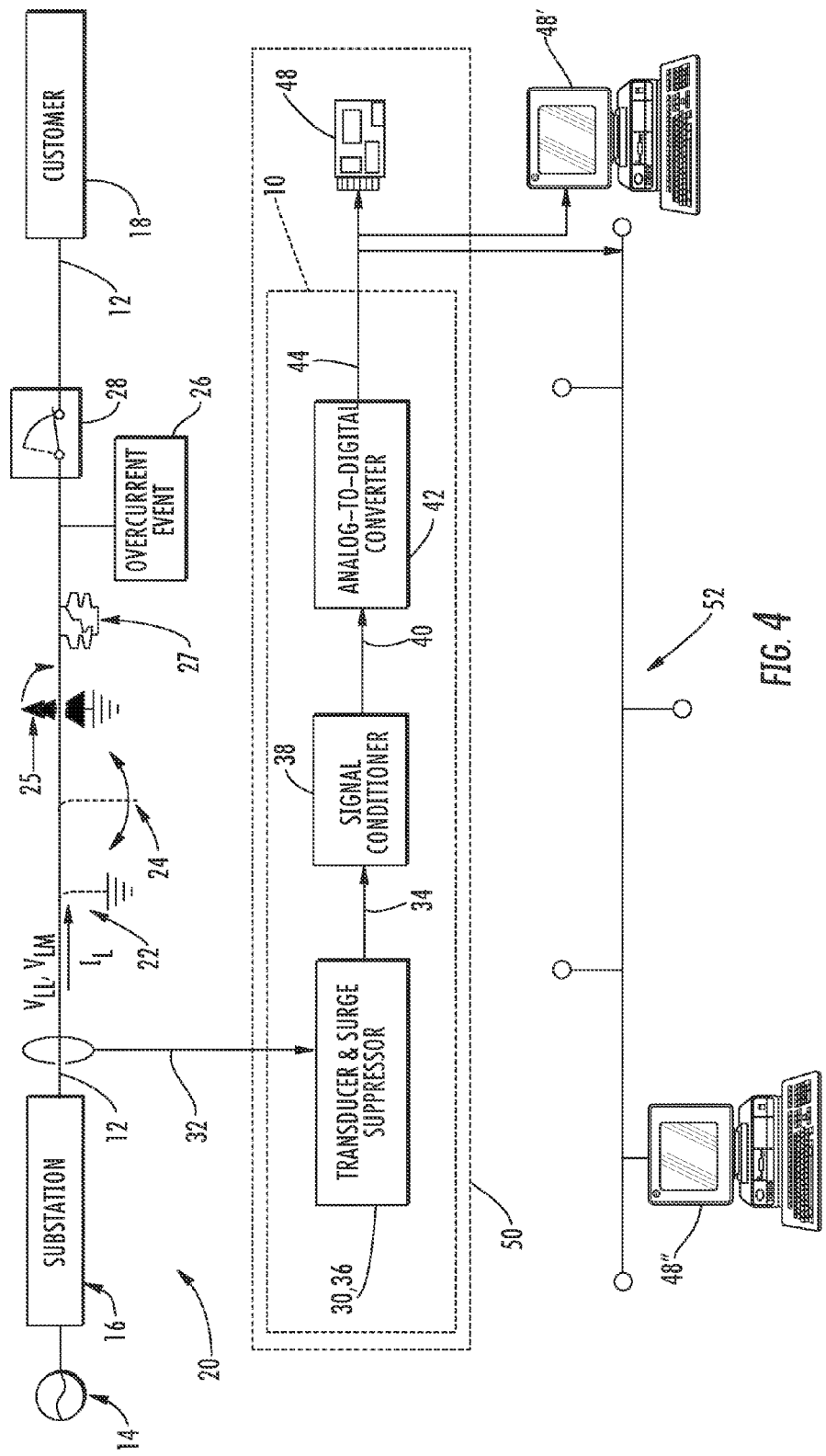
FIG. 4 is a schematic block diagram of a monitoring system for an electric power system.

The above examples are provided for illustrative purposes to demonstrate the need for prioritizing data and are by no means a complete list of the types of events that can be observed in an electrical power system. As will be described in more detail below, the prioritization method provided herein can be accomplished with power system data acquired from any source. One example of a potential source of power system data is a power system monitoring and data acquisition system which is illustrated in FIG. 4, coupled to a feeder line 12 of an electrical power system. The feeder line 12 receives power from an AC power source, such as a generating station 14, through a substation 16. Other feeder lines (not shown) may also receive power from the generating station 14 and exit the substation 16. The feeder line 12 delivers power from the substation 16 to a variety of utility customers, such as customer 18.

Altogether, the generating station 14, the substation 16, and feeder line 12 illustrate a portion of an electrical utility's power system. As used herein, the term "line" refers to one or more conductors grouped together for conducting electrical power from a first point to a second point. As used herein, the term "conductor" refers to a material that provides a path for electricity and includes a wire, a group of wires, or other conductive material.

Although the invention is described as implemented in an electrical power distribution system, it will be understood that it may be implemented in any portion of an electric power system, including but not limited to generating stations, substations, transmission lines, primary and secondary distribution lines, and customer facilities.

Most typical power systems generate and distribute power using a three-phase system. Thus, the feeder line 12 may deliver power over three conductors that each conducts a phase A, B, or C. The feeder line 12 may also have a fourth conductor which is referred to as the neutral. For convenience, power system 20 illustrated herein is such a three-phase system that includes a neutral conductor.

In the illustrated example, a data acquisition unit 10 is shown at a substation 16. Data acquisition units 10 may be used at any location within a system of power lines, i.e. generating stations, substations, transmission lines, primary and secondary distribution lines, and customer facilities. Furthermore, multiple data acquisition units 10 can be placed at selected intervals in one or more locations of interest in a power system. For example, data acquisition units 10 could be placed at a substation as well as spread along a line at various distances from a substation such as at 2, 4, 6, and 8 miles from the substation. This "sectionalization" may be useful in determining the specific location of a fault. In this regard, if a fault occurs between miles 4 and 6 from a substation, differences in the signals generated by the data acquisition units 10 positioned at miles 4 and 6 may be useful for determining where the fault occurred relative to miles 4 and 6.

Between the substation 16 and the customer 18, the feeder line 12 may be subjected to a variety of different types of events, conditions, activities, and faults. Some typical events, conditions, activities, and faults are illustrated in FIG. 4, specifically, a downed conductor 22, a dangling conductor 24, contact of vegetation such as a tree 25 or other object with the feeder line 12, and a broken insulator 27. The system may also be subject to other disrupting events, such as an overcurrent event 26 or a switching event performed by a conventional recloser 28 or the like. In addition to conventional faults, the electrical power system is also subject to mis-operation or partial failure of components. For example, devices such as a switching controller for a capacitor bank or a tap changer for a transformer can enter a failure mode in which switching occurs too often. This can cause unacceptable power quality for the customer 18 and wear out the switching equipment, which eventually damages the switching equipment and/or related equipment.

The data acquisition unit 10 includes a monitoring device, such as a sensor or transducer 30, coupled to feeder line 12 as indicated schematically by line 32. The term "monitoring device" is broadly defined herein to include sensing devices, detecting devices, and any other structurally equivalent device or system understood to be interchangeable therewith by those skilled in the art. The illustrated transducer 30 senses or monitors several line parameters, such as line voltages for each phase (line-to-line $V_{LL}$ or line-to-neutral $V_{LN}$), or load current ($I_L$) flowing through line 12 for each phase conductor or neutral conductor. Any subset of the 6 voltages or 4 currents measurable in a three-phase system may be monitored. The present invention may also be used with single-phase systems. For instance, in response to monitoring a load current $I_L$ and a line-to-neutral (phase) voltage, transducer 30 produces a parameter signal, here, a signal 34 that is indicative of dual load current and phase voltage,. The transducer 30 may be a conventional transducer or an equivalent device, such as a multiple phase current measuring device typically having one current transformer per phase, plus one on the neutral conductor, of the feeder line 12, and a multiple phase voltage measuring device, measuring the line-to-neutral voltages for each phase of line 12. Moreover, the data acquisition unit 10 may receive transducer signals from already existing current and voltage sensors. For example, if only a single phase of the voltage is measured by transducer 30 or another transducer (not shown), the data acquisition unit 10 may be equipped with conventional hardware or software of a known type to derive the other two phases. That is, knowing one phase voltage on a three-phase system, the other two phases may be obtained by applying the appropriate plus/minus appropriate (e.g., 120°) phase shift to the monitored phase voltage. It is also conceivable that other parameters, e.g. power factor, of the power flowing through line 12 may be measured with suitable transducers.

The data acquisition unit 10 may also include surge protection, for example, a surge suppressor or protector 36. The surge protector 36 may be supplied either with the transducer 30, as illustrated, or as a separate component. The surge protector 36 protects the data acquisition unit 10 from power surges on the feeder line 12, such as those caused by lightning strikes or the like.

The data acquisition unit 10 may include a signal conditioner 38 for filtering and amplifying the signal 34 to provide a clean, conditioned signal 40. Preferably, the signal conditioner 38 includes one or more filters (e.g. low-pass, band-pass, high-pass, notch) for removing frequency components not of interest for the analysis such as signal noise. The data acquisition unit 10 may be used with a single frequency in the spectrum, or a combination of frequencies.

The signal conditioner 38 may also amplify the parameter signals 34 for the appropriate range required by an analog-to-digital (A/D) converter 42. For example, the current flowing on the power system 20 may have a dynamic range of 10 to 10,000 Amps, which transducer 30 may convert into a time-varying voltage signal of, for example, +/−25 volts, whereas the A/D converter 42 may accept voltages of +/−10 volts. In this case the signal conditioner 38 appropriately converts and scales these signals for conversion by the A/D converter 42 from an analog signal 40 into a digital parameter signal 44.

When the transducer 30 is an analog device, the data acquisition unit 10 includes the illustrated discrete A/D converter 42. The transducer 30 may also be implemented as a digital device which incorporates the signal conditioning function of conditioner 38 and the analog-to-digital conversion function of the A/D converter 42.

The digital parameter signal 44 is supplied to a computing device for analysis. An example of a suitable computing device includes a conventional microcomputer (sometimes referred to as a personal computer or "PC"). However, any device capable of executing a program instruction set to analyze the digital parameter signal may be used. As shown in FIG. 4, a computing device 48 such as a "single board computer" is directly connected to the data acquisition unit 10 and may be placed inside a common housing or container with the data acquisition unit 10, or otherwise integrated with the data acquisition unit 10, to form a self-contained detection and analysis unit 50. Alternatively or in addition to the computing unit 48, an external computing unit 48' may be connected to the data acquisition unit 10 using a direct connection such as a serial or parallel cable, wireless link, or the like. Furthermore, the data acquisition unit 10 may be connected to a remote computing unit 48" through a network 52 e.g., a local area network (LAN), a wide area network (WAN), or the Internet. Also, it is noted that the analysis method described herein may be integrated into existing systems which already include data collection and/or processing capability. For example, known types of relays, power quality meters, and other equipment used in power transmission or distribution often contain microprocessor-based electronics suitable for performing the analysis.

Operation

Figure 5:
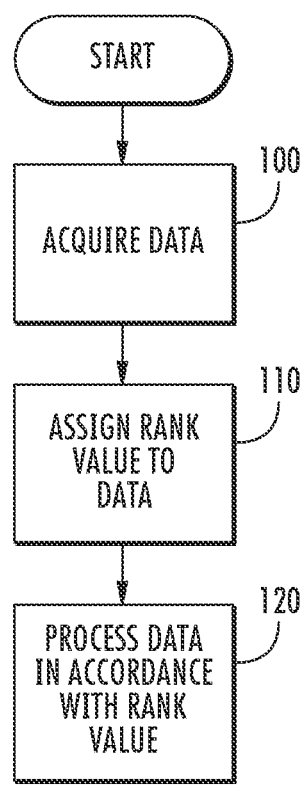
FIG. 5 is a block diagram of an example of a prioritization process carried out in accordance with an aspect of the present invention.

The term "prioritization" as used herein refers to the process of assigning a priority value, also referred to as a "rank" or "rank value" to a data record. The rank may be assigned to raw data obtained from sensors or to data that has already been processed. The rank will decide how the data is to be handled during subsequent operations on the data. FIG. 5 illustrates this process. First, in block 100, the data is acquired, for example by using the data collection unit 10 described above or by examining data already collected by other means. For descriptive purposes the data is considered to comprise one or more data portions. No particular size or boundary is implied by this term, rather each portion is simply a subset of the larger population of data. When examined individually, each of the data portions may or may not contain a power system event, as defined above.

At block 110, a rank value is assigned to each data portion. The ranking need not be simultaneous with the acquisition, but it does occur generally contemporaneously with the acquisition. A number of methods may be used to determine the actual value. For example, a chart, table, or database of empirical data may be used to store priority values corresponding to a known set of power system events. A classification algorithm would first associate the data portion with a power system event type and then a prioritization algorithm would assign a rank value based on the power system event type and stored priority values. The classification algorithm may be a simple algorithm that looks at the levels of various signals contained in the data portion and determines the approximate event type or it may be a sophisticated classifier employing techniques such as but not limited too fuzzy logic and Bayesian networks based classifiers.

After the rank is assigned, the data is subsequently processed in accordance with the rank, at block 120. The prioritization impacts one or more aspects of subsequent operations on the data. For example, when transferring data over a communication channel (data retrieval) e.g. the network 52 shown in FIG. 4, data with the highest rank may be given priority over those with lower rank values while retrieving data from a remote location. This would give the utility user faster access to the data that is considered critical. If the data is not prioritized and the data is retrieved in the order in which the data was recorded, it may be too late by the time the data corresponding to critical event is retrieved. In one example, the classification algorithm described in block 110 is run at the location where data is collected (remote location) within a few seconds of the data being acquired, and a rank is assigned to it. For example, with reference to FIG. 4, this step could be executed by software running on the computing device 48 connected to the data acquisition unit 10. Then the data is transferred to a central repository or other storage device (for example connected to or incorporated in the computing units 48' or 48") over the network 52, based on the priority values that were assigned to the data by the classification algorithm. To accomplish this, all data portions having the highest rank (i.e. most important) rank are transferred, then any data portions having the next highest rank are transferred, and so on until the lowest ranked data portions are transferred.

The prioritization method can also be used to make decisions on data storage and compression (data archival). Data collection devices and even central repositories have finite storage capabilities and storing certain types of data has little value after the passage of significant time (e.g., multiple weeks, months, years). Therefore, it is often necessary to delete or reduce the resolution of old data to allow for the storage of new data. Overwriting oldest data with the newest data strictly based upon age is not a good solution. This is because the old data may contain both "uninteresting" information like routine capacitor switching and motor starting events along with data corresponding to critical events like a downed conductor that resulted in injury or death. It is imperative that the critical events are retained even if they are older than the newer uninteresting events. Rank values attached to the data may be used to decide if the data is to be deleted, compressed or retained. For example, example, the prioritization algorithm described in block 110 may be run at one of the computing devices 48, 48', or 48". Data portions with rank values exceeding a predefined threshold may be stored in long-term or indefinite storage, while data portions with lower values may be stored in a compressed data format. Data having still lower rank values may be deleted. As an alternative to or in conjunction with a scalar rank value, the prioritization algorithm could assign discrete tags or labels to discriminate data portions representing critical events to ensure their long-term storage.

The prioritization method can also be used to make decisions on presenting data to the user, e.g. reporting and alarm generation. It is not efficient to flood the utility user with information regarding every event that happened on all feeders. Also, different utility users may be interested in different kinds of events. In this scenario, rank values may be used to decide where or to whom the data needs to be sent and the medium in which the data is to be presented. For example a repetitive overcurrent fault that needs the immediate attention of a utility user may be communicated to the user via pager, while a report on a overactive capacitor switch, that is not as critical may be sent as an email or written to a log file for later review.

The above are only example applications of prioritization and the actual applications are in no way limited to these three applications.

Optionally, more than one priority value may be assigned to the same data portion, to be used by different operations on the data. For example, the utility may need different priorities for data retrieval and for data archiving. A single priority value may not suffice. In such cases, the data portion would be assigned two or more priority values, each corresponding to an identified purpose.

The prioritization method described here is not limited to assigning a rank value to the data corresponding to an individual event. This method can be applied for assigning priorities to data obtained from a group or "cluster" of events that happen over time. For example, a single power system event may be of low significance. However, if the same or similar power system event recurs multiple times, the data portions reflecting that event may be assigned a different priority than each individual portion would otherwise be assigned.

The foregoing has described a method for prioritizing power system data. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method optimizing use of a communications channel carrying data related to an electrical power system, comprising:
   (a) acquiring a plurality of data portions representative of the behavior of an electrical power system, where the electrical power system comprises all or a part of a system that conducts electrical power between an electric power source and an electric load, the data portions containing at least one power system event which represents a deviation from steady-state operation of the electrical power system;
   (b) using a first computing device located at a first location, assigning at least one rank value each of the data portions based on the type of power system event, the rank value indicative of a priority of the event; and
   (c) transferring the data portions over a communications channel comprising a computer network from the first computing device to a second computing device at a second location remote from the first location, wherein the sequence of transfer is conducted in accordance with the rank values.

2. The method of claim 1 wherein the rank value is assigned to a group of data portions based on the recurrence of similar power system events.

3. The method of claim 1 further comprising, subsequent to step (c), storing the plurality of data portions in a storage device at the second location.

4. The method of claim 3 wherein data portions having a higher rank value are stored before data portions having a lower rank value.

5. The method of claim 3 wherein data portions having a rank value exceeding a predetermined limit are moved to long-term storage.

6. The method of claim 1 further comprising presenting at least one of the plurality of data portions to a user.

7. The method of claim 6 wherein data portions are presented to a user in the order of their associated rank values.

8. The method of claim 6 wherein the data portions are presented to a user using a communication mode selected in accordance with the assigned rank values.

9. The method of claim 1 wherein at least one of the rank values is a scalar quantity.

10. The method of claim 1 wherein at least one of the rank values is a discrete label.

11. The method of claim 1 wherein step (c) comprises performing at least two different subsequent operations on the at least one data portion, wherein a separate rank value is assigned to each data portion for each of the operations.

12. The method of claim 1 wherein the communications channel is a local area network.

13. The method of claim 1 wherein the communications channel is a wide area network.

14. The method of claim 1 wherein the communications channel is the Internet.

* * * * *